(12) United States Patent
Nunez et al.

(10) Patent No.: US 6,455,653 B1
(45) Date of Patent: Sep. 24, 2002

(54) COMPOSITIONS AND METHODS FOR THE MANUFACTURE OF OPHTHALMIC LENSES

(75) Inventors: Ivan Nunez; Venkat Sekharipuram, both of Roanoke; Michele Alton, Vinton, all of VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/566,407

(22) Filed: May 8, 2000

(51) Int. Cl.$^7$ .............................................. C08F 124/00
(52) U.S. Cl. ..................... 526/270; 526/320; 526/321; 526/323.2; 526/326; 526/333; 526/334; 428/412; 428/483; 428/521; 428/500
(58) Field of Search .................................. 428/412, 480, 428/500, 483, 521; 526/270, 320, 321, 323.2, 326, 333, 334

(56) References Cited

U.S. PATENT DOCUMENTS 5,861,934 A  *  1/1999  Blum et al. .................. 351/169

FOREIGN PATENT DOCUMENTS

| EP | 0 376 254 | | 7/1990 | |
| GB | 2034721 A | * | 6/1980 | ......... C08F/220/20 |
| WO | WO 92/05209 | | 4/1992 | |
| WO | WO 99/07756 | | 2/1999 | |

* cited by examiner

Primary Examiner—James J. Seidleck
Assistant Examiner—Melanie Bissett
(74) Attorney, Agent, or Firm—Lois A. Gianneschi

(57) ABSTRACT

The invention provides compositions for producing lenses by casting. The compositions are useful in producing ophthalmic lens by casting of a surface or layer onto a preform.

8 Claims, No Drawings

COMPOSITIONS AND METHODS FOR THE MANUFACTURE OF OPHTHALMIC LENSES

FIELD OF THE INVENTION

The present invention relates to ophthalmic lenses. In particular, the invention provides compositions for producing lenses by casting.

BACKGROUND OF THE INVENTION

The use of spectacle lenses for the correction of ametropia is well known. For example, multifocal lenses, such as progressive addition lenses, are used for the treatment of presbyopia. A number of methods are known for producing ophthalmic lenses. These methods include casting semi-finished lens blanks and subsequently polishing and grinding the blanks to form lenses, casting of whole lenses, and casting of a surface onto an optical wafer, or preform, to form a lens.

The casting of a surface onto an optical preform is advantageous in that it can reduce the number of molds required to produce a full prescriptive range of lenses. However, known resins for use in the casting of whole lenses may be unsuitable for casting of a surface onto a preform. For example, a resin used in casting onto preform must adhere to the preform. Additionally, shrinkage of the cast layer is an issue. Therefore, the invention provides compositions useful for casting surfaces onto preforms to form lenses.

DESCRIPTION OF THE INVENTION AND ITS PREFERRED EMBODIMENTS

The present invention provides compositions for producing ophthalmic lenses, including multifocal spectacle lenses such as progressive addition lenses, as well as methods using the compositions of the invention. The compositions are useful in producing ophthalmic lens by casting of a surface onto a preform. By "optical preform" or "preform" is meant an optically transparent article capable of refracting light, which article is suitable for use in producing a spectacle lens. Preferably, the lens formed using the composition of the invention is a spectacle lens, more preferably a multifocal, most preferably a progressive addition lens.

In one embodiment, the invention provides a composition comprising, consisting essentially of, and consisting of about 50 to about 80 weight percent of ethoxylated bisphenol A diacrylate, non-ethoxylated bisphenol A diaciylate, propoxylated bisphenol A diacrylate, bisphenol A epoxy acrylates, or mixtures thereof, about 5 to about 40 weight percent of benzyl acrylate, about 0 to about 30 weight percent of tetrahydrofutrfryl acrylate, isobornyl acrylate, cyclohexyl acrylate, or mixtures thereof, and about 0 to about 15 weight percent of dipentaerythritol pentaacrylate, trimethyloipropane triacrylate, pentaerythritol triacrylate, ethoxylated or propoxylated trimethylolpropane triacrylate, ethoxylated or propoxylated glycerol triacrylate, pentaerythritol tetraacrylate, ditrimethylolpropane tetraacrylate, dipentaerythritol hexaacrylate, or combinations thereof The corresponding methacrylates or styryl derivatives may be used in place of the listed acrylates, but the acrylates preferably are used.

It is a discovery of the invention that the composition of the invention is capable of providing a cast layer having a modulus sufficiently high to resist deformation under the stresses that may be imposed by processing, such as edging, grooving, of the lens periphery. Additionally, the cast layer has a glass transition temperature ("Tg") that is at a point above room temperature such that the layer maintains dimensional stability even in extreme environments. Further, the cast layer exhibits adherence to the surface upon which it is cast sufficient to withstand delamination when the lens is edged and fitted into a lens frame. Finally, the cast layer also exhibits a refractive index of about 1.55 to about 1.56 in the cured state.

Preferably, an ethoxylated bisphenol A component is used of the formula:

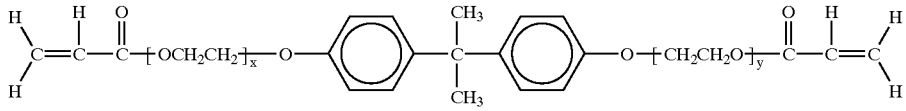

wherein x and y are each independently 1, 2, or 3 and x+y=2, 3, or 4. Suitable ethoxylated bisphenol A components are commercially available. In the composition of the invention, the weight percentages of the ethoxylated bisphenol A may be about 50 to about 80, preferably about 55 to about 65 weight percent of the total weight of the resin composition. Preferably, the level of ethoxylation on the bisphenol A diacrylate is equal to or less than about 6. A mixture of ethoxylated bisphenol A may be used, provided that about 80 weight percent or more has at least 4 to 5 ethoxylate units.

It is a discovery of the invention that, by using a relatively short-chained bisphenol A component, a cured polymer with a high refractive index results. Additionally, use of about 50 or more weight percent of the short-chained bisphenol A component in the cast layer ensures that the Tg of the layer will be at least about 15° C. greater than room temperature and have a modulus greater than about 1500 Mpa.

Benzyl acrylate preferably is used in the composition of the invention in weight percentages of about 5 to about 40, preferably about 10 to about 30 weight percent of the total weight of the resin composition. It is a discovery of the invention that benzyl acrylate is preferably selected over a phenoxy ethyl acrylate because, with high levels of ethoxylation in the formulation, the cast layer will be susceptible to oxidation and yellowing with age.

Preferably tetrahydrofurfuryl acrylate is used in amounts of about 0 to about 30, preferably about 2 to about 30, more preferably about 5 to about 15 weight percent. Dipentaerythritol pentaacrylate also is preferably used in the composition of the invention in weight percentages of about 0 to about 15, preferably about 0.5 to about 8, more preferably about 2 to about 8 weight percent. Each of these components is commercially available.

One ordinarily skilled in the art will recognize that the curing of the composition of the invention may be carried out by any suitable curing methods including, without limitation, ultra-violet light, thermal, microwave, and infra-red radiation curing alone or in combination. Preferably, UV cure using both high and low intensity UV light is used. Thus, in a preferred embodiment, the invention provides a method for producing a lens comprising, consisting essentially of, and consisting of the steps of a.) exposing a mold assembly and a composition comprising, consisting essentially of, and consisting of about 50 to about 80 weight percent of ethoxylated bisphenol A diacrylate, about 5 to about 40 weight percent of benzyl acrylate, about 0 to about 30 tetrahydrofurfuryl acrylate, and about 0 to about 15 dipentaerythritol pentaacrylate to low intensity UV light under conditions suitable to convert at least about 50 percent or more of the composition's reactive groups; and b.) exposing, subsequently, the composition to high intensity UV light under conditions suitable to complete through curing of the composition.

In the first step of the method of the invention, a mold assembly is exposed to low intensity ultraviolet light. For purposes of the invention, low intensity UV light is UV light with an intensity of about 0.5 to about 50, preferably about 1 to about 5 mW/cm$^2$. Suitable wavelengths for carrying out this step of the process are about 300 to about 450, preferably about 360 to about 400 nm. The low intensity exposure is carried out under conditions of wavelength and time suitable to convert at least about 50 percent or more of the cast composition's reactive groups and, preferably, while maintaining the rate of polymerization as low as possible, which rate is a rate at which undesirable shrinkage induced defects are avoided. One ordinarily skilled in the art will recognize that this rate will depend on a number of factors including, without limitation, the composition used and the thickness of the cast layer. The maintenance of the low polymerization rate is achieved through the use of the low intensity UV light and, optionally, one or more of using a photoinitiator concentration of about 1 weight percent or less based on the total composition weight, incorporation of periods of non-exposure into the low intensity exposure cycle, and combinations thereof The time for the low intensity exposure will depend on the composition cast onto the preform, the type and amount of initiator used, cast composition viscosity, the nature of the reactive groups, the thickness of the layer to be cast, and the intensity of the UV light. Generally, the total exposure time will be about 5 seconds to about 300 seconds, preferably about 60 seconds to about 120 seconds.

The low intensity exposure preferably is carried out in one step. However, some lens assemblies may require that the low intensity exposure be carried out in two or more steps using periods of non-exposure to the UV light of about 5 to about 60 seconds between each low intensity exposure. Preferably, periods of exposure of about 30 to about 60 seconds are alternated with non-exposure periods of about 5 to about 60 seconds.

Subsequent to the termination of the low intensity exposure, the mold assembly is exposed to high intensity UV light under conditions suitable to complete through cure of the cast composition. The intensity of the UV light for this step may be about 50 to about 2000, preferably 500 to about 1500 mW/cm$^2$. The wavelength at which the exposure is carried out may be, and preferably is, the same as that used to carry out the low intensity exposure. The same factors determinative for low intensity exposure time are determinative for the high intensity exposure time. Generally, the exposure time will be about 3 seconds to about 60 seconds, preferably about 5 seconds to about 15 seconds. The high intensity exposure may, and preferably is, carried out as a single, continuous exposure. However, the high intensity exposure also may be carried out using alternating periods of UV exposure and non-exposure periods.

The low and high intensity polymerization steps may be carried out at ambient temperature and atmospheric pressure. Preferably, the composition is hot-coated and the polymerization process is carried out at about the glass transition temperature, or Tg, of the cured composition or above. By "hot-coated " is meant that the composition is heated before it is cast to about its Tg. Heating may be accomplished by any convenient means including, without limitation, use of an oven, heat circulator, or combination thereof Polymerization at the preferred temperature is also achieved by any convenient means including, without limitation, maintaining the cure chamber at the preferred temperature by use of forced air.

The low and high intensity UV exposures may be carried out in any fashion that permits the even distribution of the light through the mold assembly. A convenient and preferred mode is to expose the mold assembly to the UV light by placing the UV light source beneath the mold assembly. Sources of low intensity UV light include, without limitation, mercury and xenon arc lamps, fluorescent-type bulbs, or the like, and combinations thereof High intensity UV light sources include, without limitation, mercury, xenon, and mercury-xenon arc lamps, FUSION™ microwave-ignited lamps, or the like, and combinations thereof Suitable sources for the UV light used in the invention are commercially available.

The mold assembly is composed of one or more mold halves, an optical preform, and the cast composition. The mold half or halves used are made of any suitable material including, without limitation, glass or plastic. The optical preforms used in the mold assemblies may be made of any suitable materials including, without limitation, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl- ethyl- and butyl methacrylates and acrylates, styrenics, polyesters, poly ether phosphine oxides, and the like and combinations thereof The preform may be produced by any convenient means including, without limitation, injection molding, injection-compression molding, thermoforming, casting, or the like.

Initiators useful in the invention are those capable of initiating polymerization of the cast resin by the polymerization method selected including, without limitation, thermal initiators, photoinitiators, and combinations thereof Preferably, a photoinitiator is selected. Suitable initiators include, without limitation, free-radical generating photoinitiators, photocationic initiators, photobase initiators, and mixtures thereof Suitable free-radical generating initiators include, without limitation, methyl benzoyl formate, aromatic ketones, including, without limitation, 2-hydroxy-2-methyl-1-phenyl-propan-1-one, 1-hydroxycyclohexylphenylketone, 2,2-di-secbutoxyacetophenone, 2,2-diethoxyacetophenone, 2,2-diethoxy-2-phenyl-acetophenone, 2,2-dimethoxy-2-phenyl-acetophenone, benzoin methyl ether, benzoin isobutyl ether, benzoin, benzil, benzil dimethyl ketal, benzyl disulfide, 2,2-dihydroxybenzophenone, benzylideneacteophenone, benozphenone, and acetophenone, 2,4,6 trimethylbenzoyl-diphenoylphosphine oxide, and the like, and combinations thereof Suitable free-radical generating initiators are commercially available or methods for their production known.

The amount of initiator used will depend on the type of initiator selected as well as the composition formulation used. Typically, the amount of initiator will be an amount effective to initiate polymerization, about 0.1 to about 5 weight percent based on the weight of the resin formulation, preferably about 0.1 to about 1 weight percent. In addition to a suitable initiator, the composition of the invention may include any desired additive, including without limitation, crosslinkers, viscosity control agents, and the like, and combinations thereof The viscosity of the cast composition may be about 5 to about 500, preferably less than about 300, more preferably about 5 to about 300, most preferably about 5 to about 100 centipoise measured at 25° C. with a Brookfield viscometer. One ordinarily skilled in the art will recognize that the weight percentages of the mono- and polyfunctional monomers must be controlled so as to achieve the desired viscosity. Additionally, the glass transition temperature, or Tg, of the cured composition used preferably is greater than about 45 ° C. One ordinarily skilled in a the art will recognize that the Tg of the cured composition should not differ significantly, preferably not by more than about 1 to about 10° C from that of the material used to form the optical preform. Preferably, the Tg of the cured composition and optical preform material are substantially the same. Further, one ordinarily skilled in the art will recognize that the desired cured composition Tg is achievable by selection of monomers and their concentrations.

The monomer mixture selected may have about 0.4 to about 0.6 equivalents of reactive groups per 100 g composition. Preferably, the monomer mixture used contains about 0.4 to about 0.6 reactive group equivalents per 100 g composition. The amount of composition cast will be an amount effective to form a surface, which amount will depend on the composition selected, the parameters of the surface desired to be formed, and the size and shape of the surface on which the composition will be cast. Typically, the amount of composition used will be about 2 to about 20 g.

Casting of the composition onto the preform to form a surface or surfaces may be accomplished by any known method. Suitable methods for casting one or more surfaces of a preform are disclosed in U. S. Pat. Nos. 5,147,585, 5,178,800, 5,219,497, 5,316,702, 5,358,672, 5,480,600, 5,512,371, 5,531,940, 5,702,819, 5,793,465, 5,859,685, 5,861,934, and 5,907,386 incorporated herein in their entireties by reference.

In general, the cast composition is dispensed into the mold assembly using any convenient means, such as by the use of a displacement pump. Preferably, the mold assembly is formed of one mold half and an optical preform, the preform acting as the second mold half The composition may be dispensed so as to form, when cured, one or both of a convex and concave surface, preferably a convex surface, on the preform. Preferably, the mold half is positioned, the resin is dispensed onto a surface of the mold half and the preform is then contacted with the resin by placing the preform on the composition. Once the mold half and preform are positioned as desired, additional composition may be dispensed into the mold assembly to ensure the elimination of air bubbles and voids.

Preferably, the mold half or halves used are of a greater diameter than that of the optical preform. This permits containment of the composition without the use of a gasket, sealing ring, or similar equipment. In those cases in which the curve radius of the preform surface in contact with the composition and mold half is less than that of the mold half, the use of a spacing means may be necessary. By "spacing means" is meant any equipment suitable for use in maintaining the desired distance between the mold half surface and the optical preform surface in contact with the composition. Exemplary equipment for use as spacing means include, without limitation, tapes, gaskets, O-rings, and the like.

Optionally, and preferably, following disassembly of the mold assembly, the lens is heated for a time and at a temperature suitable to relieve stresses resulting from the polymerization process. Heating may be carried out by any convenient method including, without limitation, using thermal, infrared, or microwave energy or combinations thereof Preferably, the lens is heated using thermal energy for about 1 to about 30, preferably about 5 to about 15 mins at a temperature of about 50 to about 125, preferably about 80 to about 110° C.

The invention will be clarified by considering the following, non-limiting examples.

EXAMPLES 1–18

The following procedure was used to form a lens using the compositions and processes of the invention. A casting composition was used of the following formulation: SR™ 285- tetrahydrofurfuryl acrylate; SR™ 349 ethoxylated bisphenol A diacrylate (3 mole); SR™ 399 dipentaerythritol pentaacrylate and IRGACURE™ 184 1- hydroxycyclohexyl phenyl ketone. Weight percentages are listed on the tables. Approximately 3.0 g of each composition was dispensed onto the concave side of a glass mold that was 81 mm diameter. A 70 mm polycarbonate optical preform was placed on the composition and additional composition dispensed, using a pipette, to ensure that no air bubbles or voids are present between the glass mold and preform.

The UV light source was positioned below the glass mold. The composition was then exposed to WV light of an intensity of approximately 2.5 mW/cm$^2$ and about 300–380 nm for 2 minutes and, subsequently of an intensity of approximately 700 mW/cm$^2$ and 3-00-380 nm for 18 secs. The lens formed from the composition and preform was removed from the mold manually and baked for 10 min at 100° C. in a convection oven.

TABLE 1

|  | Example 1 | Example 2 | Example 3 | Example 4 | Example 5 | Example 6 |
|---|---|---|---|---|---|---|
| Resin | SR ™-285 (0%) | SR ™-285 (0%) | SR ™-285 (18%) | SR ™-285 (18%) | SR ™-285 (16.5) | SR ™-285 (18.0%) |
|  | SR ™-349 (65%) | SR ™-349 (65%) | SR ™-349 (55%) | SR ™-349 (55%) | SR ™-349 (65%) | SR ™-349 (63.5%) |
|  | SR ™-399 (2.5%) | SR ™-399 (7.5%) | SR ™-399 (2.5%) | SR ™-399 (7.5%) | SR ™-399 (2.5%) | SR ™-399 (2.5%) |
|  | Benzyl Acrylate (31.5%) | Benzyl Acrylate (26.5%) | Benzyl Acrylate (23.5%) | Benzyl Acrylate (18.5%) | Benzyl Acrylate (15.0%) | Benzyl Acrylate (15.0%) |
|  | IRG 184 (1%) | IRG 184 (1%) | IRG 184 (1%) | IRG 184 (1%) | IRG 184 (1%) | IRG 184 (1%) |

TABLE 1-continued

|  | Example 1 | Example 2 | Example 3 | Example 4 | Example 5 | Example 6 |
|---|---|---|---|---|---|---|
| Viscosity (cps @ 25° C.) | 61.3 | 95 | 36.90 | 52 | 748 | 67.3 |
| DSC Data | Tmax (min) = 0.1 | Tmax (min) = 0.08 | Tmax (min) = 0.11 | Tmax (min) = 0.1 | Tmax (min) = 0.1 | Tmax (min) = 0.11 |
|  | % Conversion @ Tmax = 25.09 | % Conversion @ Tmax = 24.47 | % Conversion @ Tmax = 26.27 | % Conversion @ Tmax = 25.52 | % Conversion @ Tmax = 24.17 | % Conversion @ Tmax = 24.46 |
|  | Enthalpy (cal/g) = 82.11 | Enthalpy (cal/g) = 78.81 | Enthalpy (cal/g) = 87.23 | Enthalpy (cal/g) = 85.85 | Enthalpy (cal/g) = 82.06 | Enthalpy (cal/g) = 80.72 |
| Refractive Index (uncured) @ 20° C. | 1.54 | 1.53 | 1.52 | 1.52 | 1.53 | 1.52 |
| Modulus (Mpa) @ 25° C. | 2537 | 2107 | 2473 | 2706 | 2601 | 2541 |

TABLE 2

|  | Example 7 | Example 8 | Example 9 | Example 10 | Example 11 | Example 12 |
|---|---|---|---|---|---|---|
| Resin | SR ™-285 (11.5%) | SR ™-285 (18.0%) | SR ™-285 (0.0%) | SR ™-285 (6.5%) | SR ™-285 (0.0) | SR ™-285 (1.5%) |
|  | SR ™-349 (65%) | SR ™-349 (58.5%) | SR ™-349 (61.5%) | SR ™-349 (55%) | SR ™-349 (56.5%) | SR ™-349 (55%) |
|  | SR ™-399 (7.5%) | SR ™-399 (7.5%) | SR ™-399 (2.5%) | SR ™-399 (2.5%) | SR ™-399 (7.5%) | SR ™-399 (7.5%) |
|  | Benzyl Acrylate (15.0%) | Benzyl Acrylate (15.0%) | Benzyl Acrylate (35.0%) | Benzyl Acrylate (35.0%) | Benzyl Acrylate (35.0%) | Benzyl Acrylate (35.0%) |
|  | IRG 184 (1%) | IRG 184 (1%) | IRG 184 (1%) | IRG 184 (1%) | IRG 184 (1%) | IRG 184 (1%) |
| Viscosity (cps @ 25° C.) | 109.4 | 68.6 | 48.1 | 32 | 48.88 | 43.8 |
| DSC Data | Tmax (min) = 0.09 | Tmax (min) = 0.09 | Tmax (min) = 0.1 | Tmax (min) = 0.12 | Tmax (min) = 0.1 | Tmax (min) = 0.1 |
|  | % Conversion @ Tmax = 22.62 | % Conversion @ Tmax = 21.97 | % Conversion @ Tmax = 30.33 | % Conversion @ Tmax = 26.46 | % Conversion @ Tmax = 22.1 | % Conversion @ Tmax = 24.46 |
|  | Enthalpy (cal/g) = 79.89 | Enthalpy (cal/g) = 82.10 | Enthalpy (cal/g) = 83.18 | Enthalpy (cal/g) = 89.36 | Enthalpy (cal/g) = 86.82 | Enthalpy (cal/g) = 87.31 |
| Refractive Index (uncured) @ 20° C. | 1.53 | 1.52 | 1.53 | 1.53 | 1.53 | 1.53 |
| Modulus (Mpa) @ 25° C. | 2489 | 2315 | 2588 | 2780 | 2544 | 2669 |

TABLE 3

|  | Example 13 | Example 14 | Example 15 | Example 16 | Example 17 | Example 18 |
|---|---|---|---|---|---|---|
| Resin | SR ™-285 (9.0%) | SR ™-285 (0.0%) | SR ™-285 (9.0%) | SR ™-285 (9.0%) | SR ™-285 (9.0%) | SR ™-285 (9.0%) |
|  | SR ™-349 (60.0%) | SR ™-349 (60.0%) | SR ™-349 (60.0%) | SR ™-349 (65.0%) | SR ™-349 (70.0%) | SR ™-349 (75.0%) |
|  | SR ™-399 (5.0%) | SR ™-399 (5.0%) | SR ™-399 (0.0%) | SR ™-399 (0.0%) | SR ™-399 (0.0%) | SR ™-399 (0.0%) |
|  | Benzyl Acrylate (25.0%) | Benzyl Acrylate (34%) | Benzyl Acrylate (30.0%) | Benzyl Acrylate (25.0%) | Benzyl Acrylate (20.0%) | Benzyl Acrylate (15.0%) |
|  | IRG 184 (1%) | IRG 184 (1%) | IRG 184 (1%) | IRG 184 (1%) | IRG 184 (1%) | IRG 184 (1%) |
| Viscosity (cps @ 25° C.) | 57 | 51.1 | 38.6 | 56.0 | 81.6 | 124.6 |

TABLE 3-continued

|  | Example 13 | Example 14 | Example 15 | Example 16 | Example 17 | Example 18 |
|---|---|---|---|---|---|---|
| DSC Data | Tmax (min) = 0.1<br>% Conversion @ Tmax = 27.37<br>Enthalpy (cal/g) = 85.53 | Tmax (min) = 0.1<br>% Conversion @ Tmax = 27.9<br>Enthalpy (cal/g) = 84.25 | Tmax (min) = 0.12<br>% Conversion @ Tmax = 28.27<br>Enthalpy (cal/g) = 85.64 | Tmax (min) = 0.11<br>% Conversion @ Tmax = 26.91<br>Enthalpy (cal/g) = 79.92 | Tmax (min) = 0.1<br>% Conversion @ Tmax = 24.19<br>Enthalpy (cal/g) = 77.38 | Tmax (min) = 0.1<br>% Conversion @ Tmax = 24.48<br>Enthalpy (cal/g) = 72.94 |
| Refractive Index (uncured) @ 20° C. | 1.53 | 1.53 | 1.53 | 1.53 | 1.53 | 1.53 |
| Modulus (Mpa) @ 25° C. | 2387 | 2864 | 2698 | 2695 | 2589 | 2119 |

What is claimed is:

1. A composition comprising:

about 50 to about 80 weight percent of ethoxylated bisphenol A di(meth)acrylate:

about 5 to about 40 weight percent of benzyl (meth) acrylate:

about 2 to about 30 weight percent of tetrahydrofurfl (meth)acrylate : and about 0.5 to about 8 weight percent of dipentaerythritol penta (meth)acrylate.

2. The composition of claim 1, wherein a bisphenol A is used of the formula:

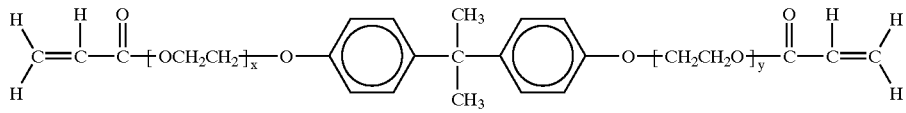

wherein x and y are each independently 1, 2, or 3 and x+y=2, 3, or 4.

3. The composition of claim 2, wherein the ethoxylated bisphenol A diacrylate is in an amount of about 55 to about 65 weight percent.

4. The composition of claim 2 or 3 wherein the benzyl (meth)acrylate is a benzyl acrylate in an amount of about 10 to about 30 weight percent, the tetrahydrofurfuryl (meth) acrylate is a tetrahydrofurfuryl acrylate in an amount of about 5 to about 15 weight percent, and the dipentaeryhthritol penta (meth)acrylate is a dipentaerythritol penta acrylate in an amount of about 2 to about 8 weight percent.

5. A spectacle lens comprising:

a preform; and a layer comprising about 50 to about 80 weight percent of ethoxylated bisphenol A di(meth)acrylate, about 5 to about 40 weight percent of benzyl (meth)acrylate, about 2 to about 30 weight percent of tetrahydrofurfuryl (meth)acrylate, and about 0.5 to about 8 weight percent of dipentaerythritol penta (meth)acrylate.

6. The spectacle lens of claim 5, wherein the bisphenol A component of the layer is of the formula:

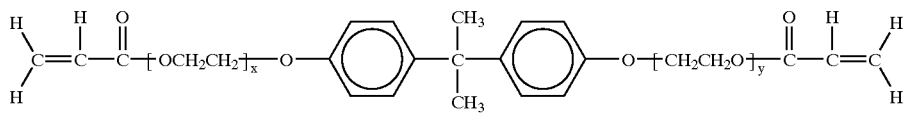

wherein x and y are each independently 1, 2, or 3 and x +y =2, 3, or 4.

7. The spectacle lens of claim 6, wherein the ethoxylated bisphenol A diacrylate of the layer is an amount of about 55 to about 65 weight percent.

8. The spectacle lens of claim 6 or 7 wherein the benzyl (meth)acrylate is a benzyl acrylate in an amount of about 10 to about 30 weight percent, the tetrahydrofurfuryl (meth) acrylate is a tetrahydrofurfuryl acrylate in an amount of about 5 to about 15 weight percent, and the dipentaerythritol penta (meth)acrylate is a dipentaerythritol penta acrylate in an amount of about 2 to about 8 weight percent.

* * * * *